US006552895B1

United States Patent
Vassallo et al.

(10) Patent No.: US 6,552,895 B1
(45) Date of Patent: Apr. 22, 2003

(54) FLEXIBLE CHARGE STORAGE DEVICE

(75) Inventors: Anthony Michael Vassallo, Hornsby Heights (AU); Clodoveo Simone Sacchetta, Guildford (AU)

(73) Assignee: Energy Storage Systems PTY LTD, North Ryde (AU)

( * ) Notice: Subject to any disclaimer, the term of this patent is extended or adjusted under 35 U.S.C. 154(b) by 0 days.

(21) Appl. No.: 09/786,908

(22) PCT Filed: Sep. 16, 1999

(86) PCT No.: PCT/AU99/00780

§ 371 (c)(1),
(2), (4) Date: Jun. 12, 2001

(87) PCT Pub. No.: WO00/16352

PCT Pub. Date: Mar. 23, 2000

(30) Foreign Application Priority Data

Sep. 16, 1998 (AU) .............................................. PP5965

(51) Int. Cl.[7] .................................................. H01G 9/08
(52) U.S. Cl. ...................... 361/517; 361/518; 361/525; 361/522; 361/306.1; 429/127
(58) Field of Search ................................ 361/517, 502, 361/306.1, 525, 509, 512, 503, 504, 518, 536, 522; 429/127

(56) References Cited

U.S. PATENT DOCUMENTS

| 5,057,385 A | * 10/1991 | Hope et al. ................. 429/162 |
| 5,326,652 A | * 7/1994 | Lake .......................... 429/127 |
| 5,591,540 A | * 1/1997 | Louie et al. ................. 429/163 |
| 5,821,006 A | 10/1998 | Patel et al. ...................... 429/3 |
| 5,907,472 A | * 5/1999 | Farahmandi et al. ......... 361/502 |
| 5,948,562 A | * 9/1999 | Fulcher et al. .............. 429/181 |
| 6,080,508 A | * 6/2000 | Dasgupta et al. ........... 429/127 |

FOREIGN PATENT DOCUMENTS

| AU | WO99/53510 | 10/1999 |
| GB | 2 046 019 | 11/1980 |
| GB | 2 046 020 | 11/1980 |

OTHER PUBLICATIONS

Derwent Abstract Accession No. 33323 D/19, JP 56–027914 A (Matsushita Electric) Mar. 18, 1981.
Derwent Abstract Accession No. 92–246734/40, JP 4–167415 a (Asahi Glass) Jun. 15, 1992.
Derwent Abstract Accession No. 92–246735/30, JP 4–167416 A (Asahi Glass) Jun. 15, 1992.
Derwent Abstract Accession No. 95–64485/09, JP 6–342739 A (Matsushita Denki Sangyo) Dec. 13, 1994.

* cited by examiner

Primary Examiner—Dean A. Reichard
Assistant Examiner—Nguyen Ha
(74) Attorney, Agent, or Firm—Kenyon & Kenyon

(57) ABSTRACT

A flexible charge storage device in the form a supercapacitor includes a flexible capacitive element, which is housed within a flexible package. The capacitive element includes a plurality of interleaved sheet electrodes which have an insulator or separator between them and which are stacked in a face-to-face configuration. Alternate electrodes are interconnected by way of respective opposed tabs that extend outwardly from the capacitive element. The supercapacitor also includes a first terminal and a second terminal that are respectively electrically connected with the opposed tabs. The flexible package includes a single folded sheet. Ends of the package, as well as the portions of both sides, which overlap, are fixedly and sealingly abutted against one another by way of heat welding or the like. Accordingly, an electrolyte is retained within the package.

55 Claims, 2 Drawing Sheets

FLEXIBLE CHARGE STORAGE DEVICE

FIELD OF THE INVENTION

The present invention relates to a charge storage device and in particular to a flexible charge storage device.

The invention has been developed primarily as a supercapacitor and will be described hereinafter with reference to that application. However, it will be appreciated that the invention is not limited to this particular field of use and is also suitable for other energy storage devices such as batteries, capacitors and the like.

BACKGROUND OF THE INVENTION

Known supercapacitors and other energy storage devices are provided in rigid containers or housings. These containers, particularly for supercapacitors offering large amounts of charge storage, are often fixedly mounted to other structures of the circuit or apparatus to which they are incorporated. The containers are generally bulky and necessitate prefabricated mounting points within the circuit or apparatus. Consequently, such circuits and apparatus do not easily accommodate a supercapacitor of differing dimension. In the event such a circuit requires a supercapacitor having different characteristics from that which was originally intended, the dimensions of the new capacitor must be very similar to the original.

It is an object of the present invention, at least in the preferred embodiments, to overcome or substantially ameliorate one or more of the disadvantages of the prior art, or at least provide a useful alternative.

DISCLOSURE OF THE INVENTION

According to a first aspect of the invention there is provided a flexible charge storage device including:

a first sheet electrode having a first terminal extending therefrom;

a second sheet electrode disposed adjacent the first electrode and having a second terminal extending therefrom;

a porous separator disposed between the electrodes; and a sealed package for containing the electrodes, the separator and an electrolyte, whereby the terminals extend from the package to allow electrical connection to the respective electrodes.

Preferably, each of the sheets includes two opposed sides, at least one of the sides of each sheet having a coating containing activated carbon.

Preferably also, the first electrode and the second electrode include respective first and second aluminium sheets. More preferably, the first and second sheets and the intermediate separator are together folded.

In a preferred form the charge storage device includes a plurality of first and second sheets and intermediate separators. More preferably, the sheets and intermediate separators are stacked. Alternatively, the sheets and the intermediate separators are wound together.

Preferably also, one of the length and breadth of the package is less than the respective length and breadth of the first sheet.

Preferably, the package includes a plurality of layers. More preferably, the layer of the package closest to the terminals is polyethylene. Even more preferably, the package is sealingly bonded to the terminals. Most preferably, the package is adhesively bonded to the terminals.

In a preferred form, the package includes polyethylene and the terminals are aluminium, wherein the adhesive bond is formed with an adhesive resin. In other embodiments use is made of an epoxy resin. In other preferred embodiments each terminal includes a respective plastics sleeve sealingly bonded thereto. In this embodiment the package is preferably sealingly engaged with the sleeves. In further embodiments a plastics layer is used in place of the sleeve.

Preferably, the sheets are abutted against the separator.

In a preferred form the device, when maintained at 80° C. for 100 hours, retains at least 90% by weight of the electrolyte. Even more preferably, and under the same conditions, the device retains at least 95% by weight of the electrolyte.

According to a second aspect of the invention there is provided a method of producing a flexible charge storage device, the method including the steps of:

providing a first sheet electrode having a first terminal extending therefrom;

disposing a second sheet electrode adjacent the first electrode, the second electrode having a second terminal extending therefrom;

disposing a porous separator between the electrodes; and sealing the electrodes and the separator in a package containing an electrolyte, whereby the terminals extend from the package to allow electrical connection to the respective electrodes.

Preferably, each of the sheets includes two opposed sides, and the method includes the further step of applying a coating containing activated carbon to at least one of the sides of each sheet.

Preferably also, the first electrode and the second electrode are respective first and second aluminium sheets. More preferably, the method includes the step of folding together the first and second sheets and the intermediate separator.

In a preferred form, the method includes the step of providing a plurality of first and second sheets and intermediate separators. More preferably, the method includes the step of stacking the sheets and intermediate separators. Alternatively, the method includes the step of winding together the sheets and the intermediate separators.

Preferably, the package includes a plurality of layers. More preferably, the layer of the package closest to the terminals includes polyethylene. In some embodiments that layer is coated with an ionomer and more preferably coated with SURLYN. Even more preferably, the method includes the step of sealingly bonding the package to the terminals. Most preferably, the method includes the step of adhesively bonding the package to the terminals.

Preferably also, the package includes polyethylene and the terminal is aluminium, wherein the method includes the step of forming the adhesive bond with a resin. Examples of commercially available and suitable resins are those which are marketed under the names NUCREL and PRIMACOR. In other embodiments use is made of an epoxy resin. In further embodiments the method includes the steps of sealingly bonding a respective plastics sleeve to each terminal and then sealingly engaging the package with the sleeves.

In a preferred form the method includes the step of abutting the sheets against the separator.

BRIEF DESCRIPTION OF THE DRAWINGS

A preferred embodiment of the invention will now be described, by way of example only, with reference to the accompanying drawings in which.

PREFERRED EMBODIMENT OF THE INVENTION

Figure 1:
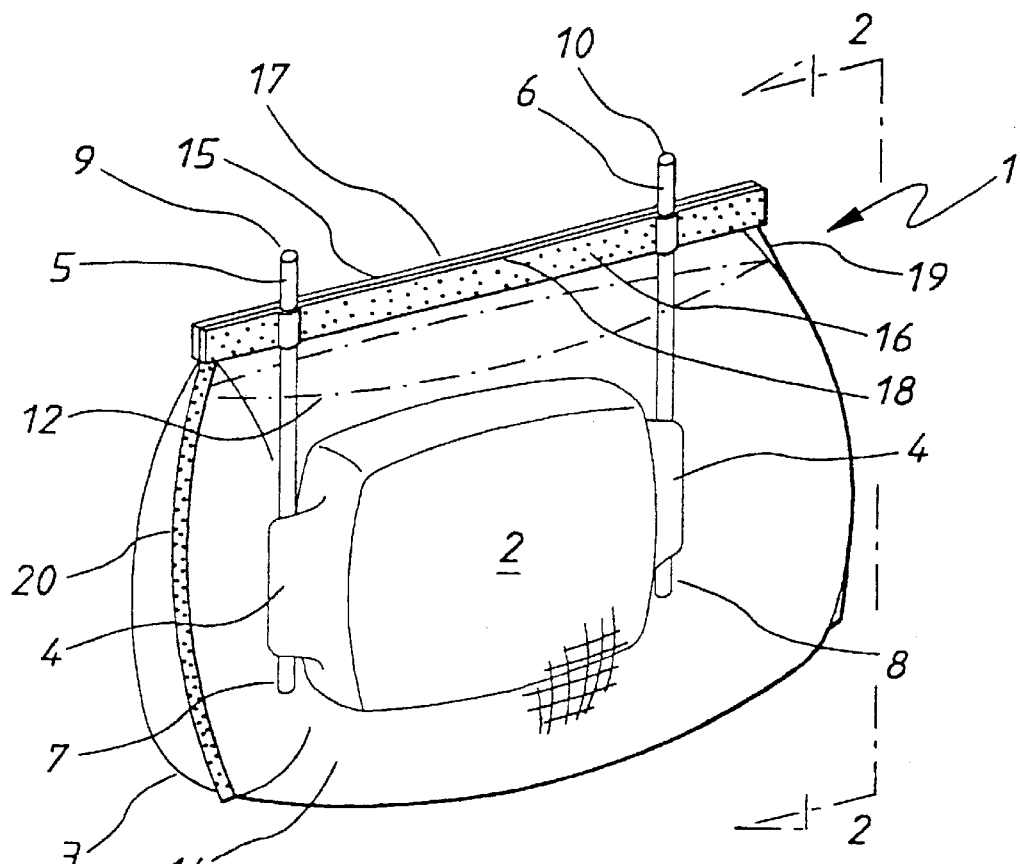
FIG. 1 is a schematic perspective view of a charge storage device according to the invention.
Figure 2:
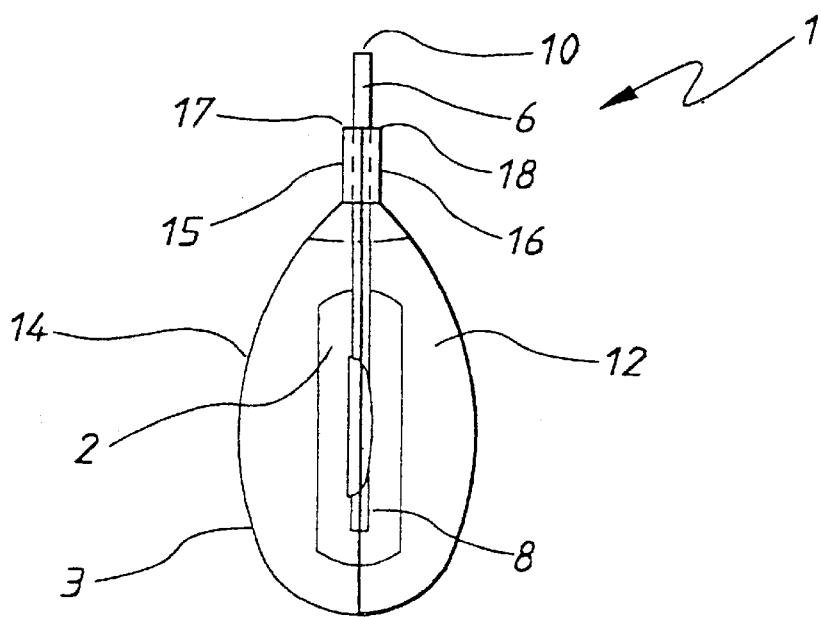
FIG. 2 is a cross section taken along line 2—2 of FIG. 1.

Referring to FIGS. 1 and 2, a flexible charge storage device in the form a supercapacitor 1 includes a flexible capacitive element 2 which is housed within a flexible plastics package 3. Element 2 includes a plurality of interleaved sheet electrodes having an insulator or separator therebetween and which are stacked in a face to face configuration. Alternate electrodes are interconnected by way of respective opposed tabs 4 which extend outwardly from element 2.

Supercapacitor 1 also includes a first terminal 5 and a second terminal 6 which are respectively electrically connected with opposed tabs 4. More particularly, electrodes 5 and 6 have first ends 7 and 8 which are disposed within package 3, and respective second ends 9 and 10 which are disposed outside of package 3. Ends 9 and 10, in use, are connected to other components in the circuit of interest to allow electrical connection with the electrodes of element 2.

In other embodiments the sheet electrodes are folded together, while in further embodiments they are wound together. In any event, element 2 is flexible in that it is pliable. In the present embodiment element 2 includes four stacked aluminium sheets each coated on one side with a thin activated carbon layer. Each sheet is maintained in a spaced apart configuration from the adjacent sheet by way of intermediate porous separators. Each sheet electrode is about 40 mm×40 mm and the total thickness of element 2 is about 0.5 mm.

In other embodiments both sides of the aluminium sheets include a carbon coating.

Terminals 5, and 6 are aluminium, although in other embodiments use is made different conductive materials.

Package 3 contains element 2 which is pre-soaked with an electrolyte 12. Package 3 is impervious to the electrolyte and, as such, maintains it in contact with the element 2. In this case, the separator included within element 2 is porous to allow movement of ions between the adjacent electrodes. The electrolyte should be as conductive as possible and, in this embodiment, is an organic electrolyte based upon ethylene carbonate and dimethylcarbonate. In other embodiments other electrolytes are used such as tetraethylammonium tetrafluoroborate dissolved in propylene carbonate or acetonitrile at 0.5 to 1.5 M concentration. Other electrolytes would be known to those skilled in the art.

Package 3 include a single folded laminar plastics sheet 14 which extends between two ends 15 and 16 and which has edges 17, 18, 19 and 20. Ends 15 and 16, as well as the portions of both sides 19 and 20 which overlap, are fixedly and sealingly abutted against one another by way of heat welding or the like. Accordingly, electrolyte 12 is retained within package 3. In the configuration shown the approximate length and breath dimensions of package 3 are both 50 mm.

Sheet 14, in this embodiment, includes four layers which have a combined thickness of about 100 microns. In other embodiments however, use is made of a sheet having a thickness in the range of 30 microns to 1 mm. Preferably, however, to optimise the flexibility and barrier properties of sheet 14 its total thickness is in the range of 50 microns to 200 microns.

In this embodiment the first or innermost layer of sheet 14 is polyethylene which is heat sealable and chemically unaffected by electrolyte 12. In other embodiments where use is made of alternative electrolytes it may be necessary to select an alternative innermost layer. The layer adjacent the polyethylene is ethylene vinyl alcohol which acts as a solvent and oxygen barrier. A layer of nylon is then utilised. This layer provides further solvent resistance and mechanical strength. The next or outermost layer in this embodiment is a barrier or protective layer and is preferably constructed from polyethylene. In other embodiments the outer layer is constructed of protective material other than polyethylene.

Not only does package 3 contain electrolyte 12, it prevents the ingress of water or other contaminants in to the electrolyte. Moreover, package 3 provides for a more effective sealing engagement with terminals 5 and 6. In this embodiment, where the terminals are made from aluminium and the inner layer of sheet 14 is polyethylene, the two are adhered together. Most preferably the adhesive is epoxy resin.

In another embodiment the packaging includes a surlyn coating and the resin selected from one of the commercially available resins such as the resins that are marketed under the names NUCREL and PRIMACOR.

To further enhance the sealing engagement some embodiments make use of pretreating the polyethylene surfaces by exposure to a corona discharge.

In alternative embodiments respective plastics sleeves or layers are initially bonded to terminals 5 and 6. The preferred sleeve is made from polyethylene, although other embodiments utilise other polymers such as polyethylene acrylic acid. The sleeves are heat bonded to the terminals. Thereafter, package 3 is heat sealed to the sleeves to form a sealed container for electrolyte 12.

In some embodiments the sleeve or layer is adhesively bonded to the terminals with a resin.

A number of embodiments of the invention were tested for electrolyte retention at elevated temperatures. The first test was conducted using a package of the preferred embodiment measuring 50 mm×50 mm and containing dimethylcarbonate solvent. The supercapacitor was maintained at 80° C. and the weight loss of electrolyte was found to be 1.9%, 3.2%, 7.3% and 13.1% at 100 hours, 200 hours, 600 hours and 1000 hours respectively.

Figure 3:
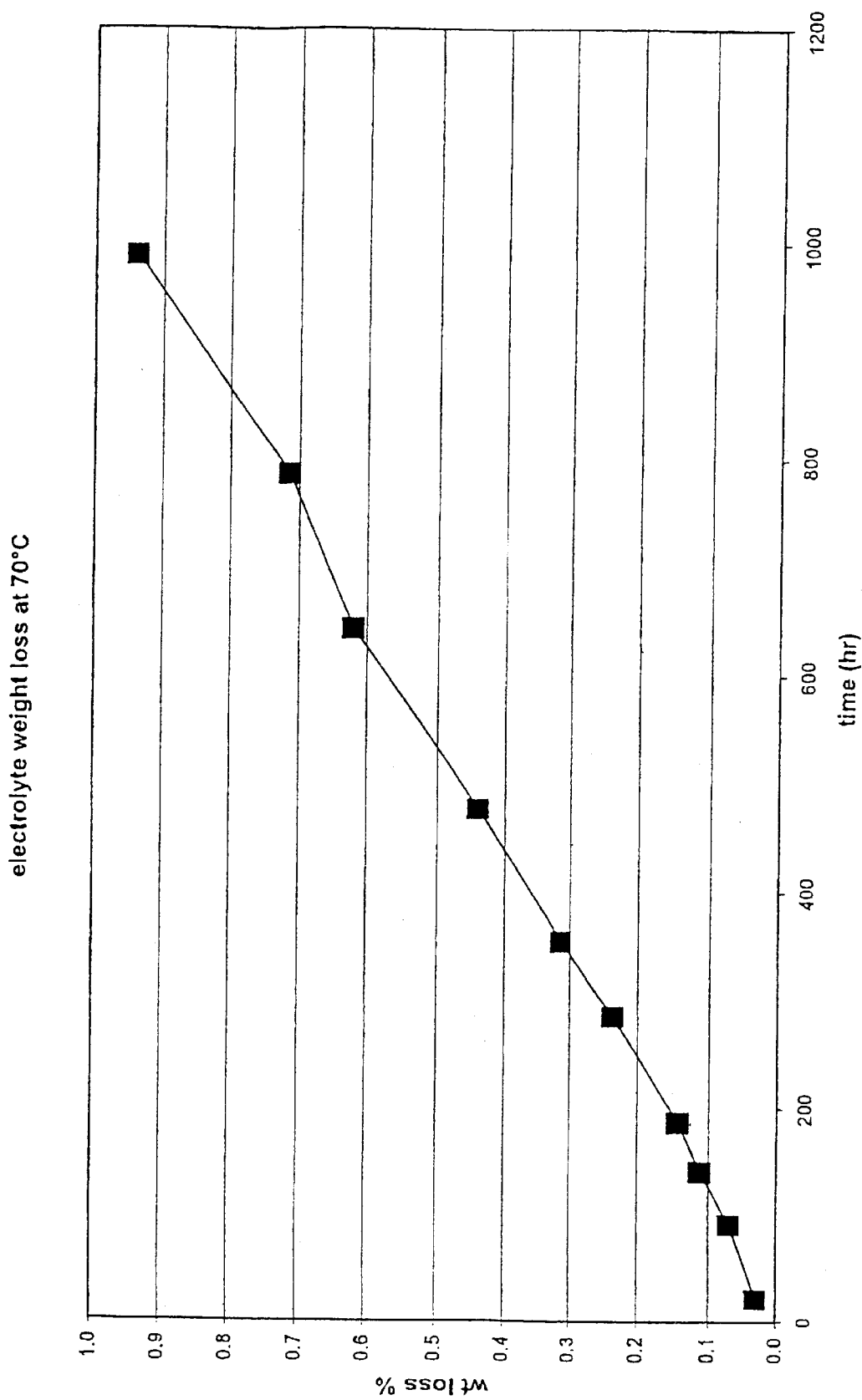
FIG. 3 is a graph of the electrolyte weight loss for one of the supercapacitors according to the invention.

The second test was conducted with another supercapacitor that provides about 15 Farads at 2.5 Volts. The electrolyte weight loss for the capacitor is plotted against time and illustrated in FIG. 3. As shown in FIG. 3, when maintained at 70° C. for 1000 hours, the supercapacitor retained at least 99% of the electrolyte by weight. This supercapacitor has the following structure:

four aluminium sheets, each being 70 mm by 60 mm and including respective opposed carbon coatings;

two terminals being integrally formed with and extending away from the respective sheets;

a separator for maintaining the sheets being in a fixed spaced apart configuration;

a multi-layer laminate packaging including an aluminium layer and an outer surlyn layer;

an acetonitrile solvent containing a 1 M solution of tetraethylammonium tetrafluoroborate;

a PRIMACOR resin for sealing the package against itself and the terminals;

a total weight of 6 grams; and overall dimensions of about 80 mm×70 mm×2 mm.

Supercapacitor 1 weighs approximately 5 grams and includes a capacitance of about 3 Farads at 2.5 Volts. As would be appreciated by a skilled addressee many other configurations are available. The present configuration, however, is particularly suited to mobile communications, self propelled toys, and automotive applications. In one specific embodiment, supercapacitor 1 is placed in parallel with a standard mobile telephone battery. Such an arrangement not only extends the life of the battery but will quickly recharge. The compact and flexible nature of the capacitor and its package 3 allows them to be placed in confined spaces and in many different configurations. Moreover, so far as the space available permits, additional like capacitors can be added in parallel to further the available charge storage capacity for the electronic device. In some cases, capacitor 1 is contained within the housing of the mobile telephone, while in other embodiments it is contained within the housing of the battery. However, in still further embodiments, supercapacitor 1 is maintained in the cavity between the mobile telephone and the battery and, as such can be retro fitted to existing mobile telephones.

In the event the mobile telephone includes the necessary voltage regulation circuitry it can be powered by the supercapacitor only.

Another application of supercapacitor 1 is in combination with the laptop computers and other electronic equipment. Other applications include portable power tools and other cordless electric devices. Again, although supercapacitor 1 will advantageously operate in parallel with an existing battery, it is, in some embodiments, utilised as the sole power source.

Although the invention has been described with reference to specific examples, it will be appreciated by those skilled in the art that it may be embodied in many other forms.

What is claimed is:

1. A flexible charge storage device including:
   a first sheet electrode having a first terminal extending therefrom;
   a second sheet electrode disposed adjacent to the first electrode and having a second terminal extending therefrom;
   a porous separator disposed between the electrodes; and
   a sealed package for containing the electrodes, the separator and an electrolyte, whereby the terminals extend from the package to allow electrical connection to the respective electrodes and the package includes a plurality of layers, one of the layers being an electrolyte barrier layer and a strengthening layer.

2. A device according to claim 1, wherein two of the layers sandwich the one layer.

3. A device according to claim 2, wherein the one layer includes ethylene vinyl alcohol.

4. A device according to claim 2, wherein the one layer includes ethylene vinyl alcohol and nylon.

5. A device according to claim 2, which, when maintained at 80° C. for 100 hours, retains at least 90% by weight of the electrolyte.

6. A device according to claim 5, which, when maintained at 80° C. for 100 hours, retains at least 95% by weight of the electrolyte.

7. A device according to claim 2, which, when maintained at 70° C. for 1000 hours, retains at least 99% by weight of the electrolyte.

8. A device according to claim 2, wherein the sheet electrodes are abutted against the separator.

9. A device according to claim 2, the device having a thickness of about 3.0 mm or less.

10. A device according to claim 2, wherein the electrodes and the separator form a capacitive element that has a thickness of less than 1 mm.

11. A device according to claim 10, wherein the capacitive element has a thickness of less than 0.5 mm.

12. A device according to claim 2, wherein the sealed package is a laminate having a thickness 1 mm or less.

13. A device according to claim 12, wherein the laminate has a thickness in the range of about 30 microns to 200 microns.

14. A flexible charge storage device including:
   a first sheet electrode having a first terminal extending therefrom;
   a second sheet electrode disposed adjacent to the first electrode and having a second terminal extending therefrom;
   a porous separator disposed between the electrodes; and
   a sealed package for containing the electrodes, the separator and an electrolyte, whereby the terminals extend from the package to allow electrical connection to the respective electrodes and the package includes a plurality of layers, one of the layers being an electrolyte barrier layer for enabling the device to retain at least 90% by weight of the electrolyte when the device is maintained at 80° C. for 100 hours.

15. A device according to claim 14, which, when maintained at 80° C. for 100 hours, retains at least 95% by weight of the electrolyte.

16. A device according to claim 14, wherein each of the electrodes includes two opposed sides, at least one of the sides of each electrode having a coating including activated carbon.

17. A device according to claim 14, wherein the first electrode and the second electrode include respective first and second aluminium sheets.

18. A device according to claim 17, wherein the first and second sheets and the separator are together folded.

19. A device according to claim 17, including a plurality of like first sheets, a plurality of like second sheets and a plurality of intermediate separators.

20. A device according to claim 17, wherein the sheets and intermediate separators are stacked.

21. A device according to claim 17, wherein the sheets and the intermediate separators are wound together.

22. A device according to claim 14, wherein one of the length and breadth of the package is less than the respective length and breadth of the first sheet.

23. A device according to claim 14, wherein the layer of the package closest to the terminals includes polyethylene.

24. A device according to claim 23, wherein the layer closest to the terminals includes an ionomer coating.

25. A device according to claim 14, wherein the package is sealingly bonded to the terminals.

26. A device according to claim 24, wherein the package is adhesively bonded to the terminals.

27. A device according to claim 25, wherein the package includes a ionomer coating and the terminals are aluminium, wherein the adhesive bond is formed with an adhesive resin.

28. A device according to claim 27, wherein the resin is an epoxy resin.

29. A device according to claim 27, wherein each terminal includes a respective plastics sleeve sealingly bonded thereto.

30. A device according to claim 29, wherein the package is sealingly engaged with the sleeves.

31. A device according to claim 27, including a plastics sheet disposed in sealing abutment with the terminals and the package.

32. A device according to claim 14, the device having a thickness of about 3.0 mm or less.

33. A flexible charge storage device including:
a first sheet electrode having a first terminal extending therefrom;
a second sheet electrode disposed adjacent to the first electrode and having a second terminal extending therefrom;
a porous separator disposed between the electrodes; and
a sealed package for containing the electrodes, the separator and an electrolyte, whereby the terminals extend from the package to allow electrical connection to the respective electrodes, the packaging including a plurality of layers, one of the layers being an electrolyte barrier layer for enabling the device to retain at least 99% by weight of the electrolyte when the device is maintained at 70° C. for 1000 hours.

34. A method of producing a flexible charge storage device, the method including the steps of:
providing a first sheet electrode having a first terminal extending therefrom;
disposing a second sheet electrode adjacent the first electrode, the second electrode having a second terminal extending therefrom;
disposing a porous separator between the electrodes;
providing a package including a plurality of layers, one of the layers being an electrolyte barrier layer and a strengthening layer; and
sealing the electrodes and the separator in the package including an electrolyte, whereby the terminals extend from the package to allow electrical connection to the respective electrodes.

35. A method according to claim 34, wherein two of the layers sandwich the one layer.

36. A method according to claim 35, wherein the one layer includes ethylene vinyl alcohol.

37. A method according to claim 35, wherein the one layer includes ethylene vinyl alcohol and nylon.

38. A method according to claim 35, including the further step of applying a coating including activated carbon to at least one of the two opposed sides of each of the electrodes.

39. A method according to claim 35, including the step of folding together first and second aluminum sheets and the separator, wherein the first and second electrodes are the respective first and second sheets.

40. A method according to claim 39, including the step of providing a plurality of like first sheets, a plurality of like second sheets and a plurality of intermediate separators.

41. A method according to claim 40, including the step of stacking the sheets and the intermediate separators.

42. A method according to claim 40, including the step of winding together the sheets and the intermediate separators.

43. A method according to claim 35, including the step of disposing a polyethylene layer of the package closest to the terminals, wherein the package includes at least one layer of polyethylene.

44. A method according to claim 43, including the step of sealingly bonding the package to the terminals.

45. A method according to claim 44, including the step of adhesively bonding the package to the terminals.

46. A laminar packaging material for a charge storage device, the material including a plurality of layers, one of the layers being an electrolyte barrier layer and a strengthening layer, wherein the combined plurality of layers is flexible.

47. A packaging material as described in claim 46, wherein two of the layers sandwich the one layer.

48. A packaging material as described in claim 47, wherein the one layer includes ethylene vinyl alcohol.

49. A packaging material as described in claim 47, wherein the one layer includes ethylene vinyl alcohol and nylon.

50. A packaging material as described in claim 47, which, when maintained at 80° C. for 100 hours, retains 90% by weight of the electrolyte.

51. A packaging material as described in claim 50, which, when maintained at 80° C. for 100 hours, retains 95% by weight of the electrolyte.

52. A packaging material as described in claim 47, which, when maintained at 70° C. for 1000 hours, retains 99% by weight of the electrolyte.

53. A packaging material assording to claim 47, wherein the combined thickness of the layers is less than about 1 mm.

54. A packaging material according to claim 47, wherein the combined thickness of the layers is less than about 100 microns.

55. A packaging material according to claim 47, wherein the combined thickness of the layers is about 30 microns.

* * * * *